Sept. 6, 1955  G. W. JACKSON  2,717,344
ELECTRIC MOTOR OPERATED POWER TRANSMITTING DEVICE
Filed April 11, 1952  3 Sheets-Sheet 2

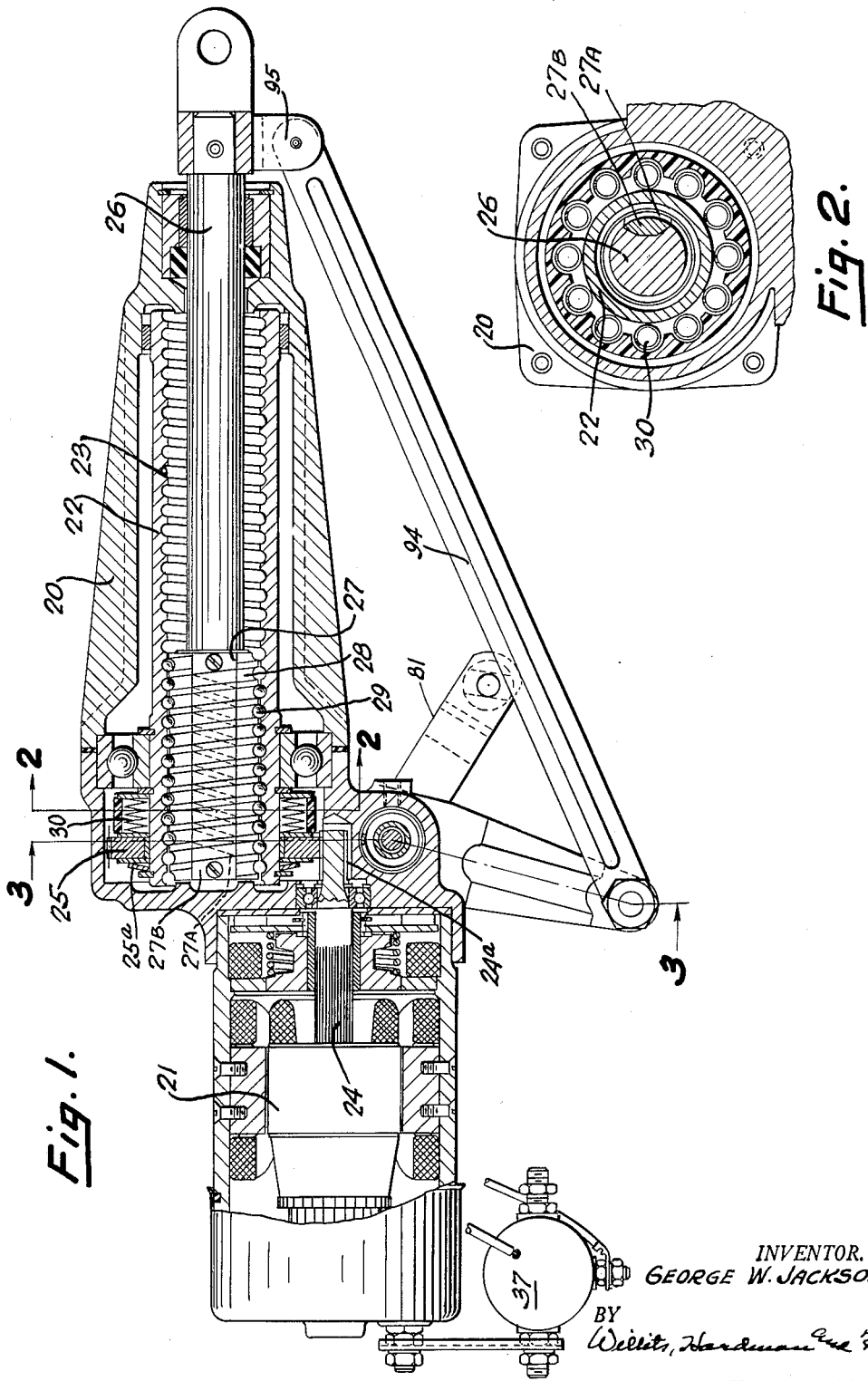
Sept. 6, 1955     G. W. JACKSON     2,717,344
ELECTRIC MOTOR OPERATED POWER TRANSMITTING DEVICE
Filed April 11, 1952     3 Sheets-Sheet 1
INVENTOR.
GEORGE W. JACKSON
BY
HIS ATTORNEYS.

INVENTOR.
GEORGE W. JACKSON
BY
Willits, Hardman and Fehr
HIS ATTORNEYS

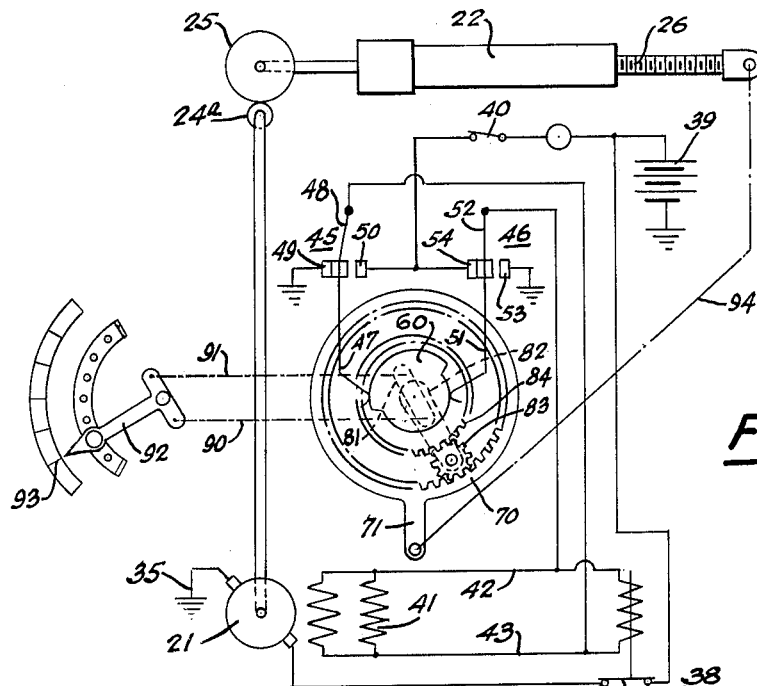
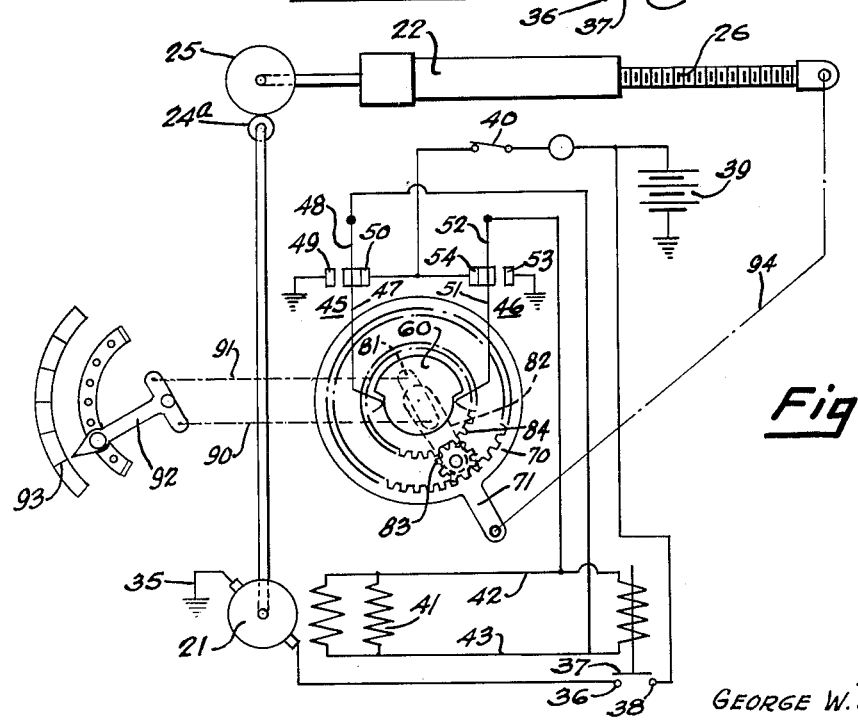

United States Patent Office 2,717,344
Patented Sept. 6, 1955

2,717,344

ELECTRIC MOTOR OPERATED POWER TRANSMITTING DEVICE

George W. Jackson, Dayton, Ohio, assignor to General Motors Corporation, Detroit, Mich., a corporation of Delaware Application April 11, 1952, Serial No. 281,844

4 Claims. (Cl. 318—31)

This invention relates to a power transmitting actuator and its control mechanism.

It is among the objects of the present invention to provide a power driven actuator with a control mechanism which normally renders the actuator inactive, but which is manually adjustable into a plurality of selected positions for rendering the actuator active in one direction or the other and for a predetermined range of movement in accordance with the manual adjustment of the control mechanism, the actuator itself being operative to return said control mechanism to its normal position as said actuator is being moved in the predetermined direction so that said actuator is rendered inactive when completing said predetermined movement.

The invention is disclosed in combination with an actuator having a reversible electric motor operatively connected to a reciprocative shaft extended from or retracted into a housing in accordance with the direction of rotation of the driving motor also in said housing. The above object may be accomplished by the provision of a pair of switches in said housing, normally held in motor circuit breaking positions by a rotatable cam interposed between and engaged by the movable member of each switch. A lever manually movable into any one of a plurality of selected positions is connected through planetary gearing and linkage with the cam so that operation of said lever into a selected position will adjust the cam into a corresponding position in which one or the other switch is actuated into motor circuit closing position for rendering the motor active to reciprocate the actuator shaft. This actuator shaft is connected through linkage with one of the gears of said planetary gearing and reciprocation of the shaft rotates said gear to effect return of the cam to its normal position. The cam reaches its normal switch opening position under the influence of the actuator shaft movement when said actuator shaft has been extended or retracted to a location or position determined by the selected position into which the manually movable lever has been moved. The returning movement of said cam in no way affects the selected position into which the manually operated lever has been moved and therefore any succeeding adjustment of said lever is made from the existing location of said lever.

Further objects and advantages of the present invention will be apparent from the following description, reference being had to the accompanying drawings wherein a preferred embodiment of the present invention is clearly shown.

In the drawings:

Fig. 1 is a longitudinal sectional view of the actuator equipped with the present invention.

Fig. 2 is a transverse sectional view taken substantially along the line and in the direction of the arrows 2—2 in Fig. 1.

Fig. 6 is a view similar to Fig. 5, showing certain elements of the entire mechanism in another position, and Fig. 7 is another similar view showing certain elements in still another operating position.

Figures 3, 4:
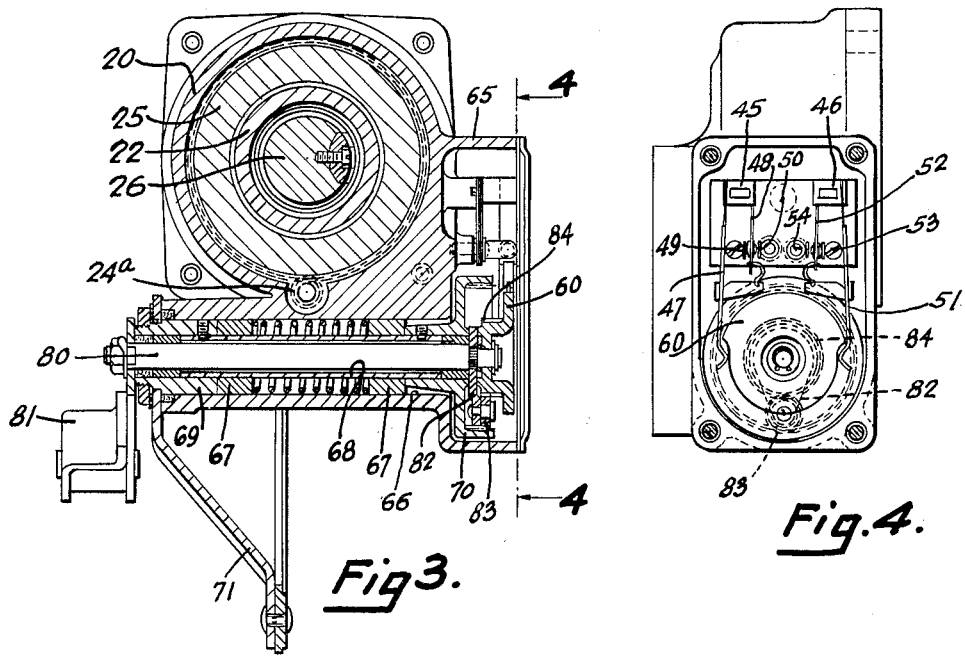
Fig. 3 is a similar sectional view taken substantially along the line and in the direction of the arrows 3—3 in Fig. 1.
Fig. 4 is an end view of the switch portion of the control mechanism, taken in the direction of the arrows 4—4 in Fig. 3.

The actuator comprises a housing 20 made up of several component portions, one of which contains the electric motor 21 which provides the motive power for operating the actuator. A tubular member 22 interiorly provided with spiral slots 23 is journaled in the housing 20 so as to be rotatable but not movable longitudinally. The armature or drive shaft 24 of the motor provides a pinion 24a which meshes with gear 25, said gear being engaged by a slip clutch 25a connected with the tubular member 22. This slip clutch is adapted to transmit power from the motor 21 to the tubular member 22 and is also adapted to slip at a predetermined overload when the actuator is subjected to such an overload. A driven shaft 26 is slidably supported in a bearing provided in housing 20 and extends to the exterior of said housing. The inner end of the shaft 26 has a nut 27 secured thereto in any suitable manner the outer peripheral surface of said nut having spiral groove 28 corresponding to the grooves 23 within the tubular member 22. A plurality of balls 29 are in the spiral channel formed by the coinciding spiral grooves 23 and 28, these balls mechanically connecting the nut 27 with the tubular member 22 and circulating through the spiral channel formed by the grooves 23 and 28 and through the channels 27a provided in the insert 27b as the tubular member 22 rotates relative to the nut 27 whereby the shaft 26 is reciprocated in the housing 20. The motor 21 being of reversible type may operate the tubular member 22 in either direction so that the shaft 26 may be moved outwardly of the housing 20 when the motor rotates in one direction and may be retracted or drawn back again into the housing when the motor 21 operates in the opposite direction. Fig. 2 illustrates a plurality of springs 30 carried by the tubular member 22 and loading the overload friction clutch 25 so that it may maintain driving connections between the motor and rotatable member 22 within predetermined load application upon the actuator which, when an excessive load applied thereto, causes the friction clutch, or what may be termed the overload clutch 25, to slip.

In the present invention the actuator is intended to move a load into selected positions upon the operation of a manually operable member. The electric motor which operates the actuator in one direction or the other must be provided with control mechanism so that it will operate the actuator in one direction or the other for a predetermined duration so that the reciprocating shaft 26 is moved to the selected position into which the load connected to shaft 26 is desired to be adjusted or moved. In Figures 4 to 7 inclusive the various elements and their mechanical and electrical connections are schematically illustrated. The electric motor 21 is illustrated as having a grounded connection 35 on one side, the other side of the motor being connected to one terminal 36 of an electromagnetically actuated switch 37, the opposite terminal 38 of which is connected to the source of electrical power shown as a storage battery 39 in the present instance. This side of the battery is also connected to a master switch 40. The electric motor has two field windings 41, one side of which being connected with the lead wire 42, the other with the lead wire 43. The electromagnetic winding of the switch 37 is connected across the two lead wires 42 and 43.

A pair of double switches are illustrated in the drawings and are operative to control the energization of the electric motor 20. Fig. 4 illustrates these two switches designated as a whole by numerals 45 and 46 respectively. Switch 45 comprises an operator arm 47 operatively connected with a movable contact blade 48 which carries oppositely disposed contact elements one adapted electrically to engage the grounded stationary terminal contact 49, the contact element on the opposite side of the movable blade 48 being adapted to engage the stationary terminal contact 50 of switch 45. Switch 46 likewise has an actuator arm 51 operatively connected to the movable contact carrying blade 52, one contact of which is engageable with the grounded stationary terminal contact 53 while the other contact element on the blade 52 is adapted to engage the stationary contact 54 of switch 46. When in normal position, that is, when switches 45 and 46 are in position when neither one of them causes energization of the electric motor 20, contact carrying blade 48 is engaged with terminal contact 50 and contact blade 52 of switch 46 is in engagement with the terminal contact 54. When contact blade 48 is moved into engagement with the terminal contact 49 the grounding circuit for the electric motor is completed so that the electric motor 20 will be rendered active in one direction. On the other hand when contact blade 52 is moved out of its normal position so that it engages the grounding contact terminal 53 of the switch 46, then the grounding circuit of the electric motor is again completed causing the motor to be energized and rendered active to rotate in the opposite direction.

The actuating arms 47 and 51 of the switches 45 and 46 respectively constantly engage controller cam 60 shaped as shown in Fig. 4 to maintain the switches 45 and 46 in their grounding circuit breaking positions normally but when said cam is rotated in one direction or the other out of normal position the raised surface thereon will actuate either one or the other operating arm 47 or 51 to actuate the respective switches into the grounding circuit closing position as shown in Fig. 6.

The aforementioned switch controlling cam 60 is manually movable to adjust the respective switches 45 and 46 into circuit closing positions and is automatically movable by the actuator itself to again actuate said switches 45 or 46 into their circuit opening positions when the actuator has been moved into a desired extended or retracted position, that is, when the shaft 26 of the actuator has been moved outwardly and inwardly of the housing 20 predeterminately. The mechanism for manually actuating the cam 60 is illustrated in Fig. 3. In this figure the housing 20 is shown to have an extension 65 forming a box in which the switching mechanism is housed. A transverse opening 66 has bearings 67 therein which rotatably support a tubular member 68 to one end of which there is attached a collar 69 so as to be rotatable with the tubular member. To the opposite end of the tubular member 68 there is attached an internal ring gear 70 located within the switch box 65. An operating lever 71 is secured to the collar 69 so that oscillation of the lever 71 will rotate the collar and its attached tubular member 68 in one direction or the other. Tubular member 68 rotatably supports a shaft 80 therein and coaxial thereof, the outer end of said shaft having the lever 81 secured thereto so that oscillation of the lever 81 will rotate the shaft 80 back and forth. To the other end of this shaft 80 there is attached an arm 82 so as to rotate with the shaft. A pinion 83 is rotatably carried upon the arm 82 at its outer free end this pinion 83 meshing with the gear 70. The cam 60 is rotatably supported upon the end of the shaft 80 opposite the lever 81 thereon so as to be coaxial of said shaft 80, the cam 60 having a hublike extension the outer peripheral edge of which is provided with teeth to form the gear 84 with which pinion 83 also meshes. Thus, when lever 81 is moved rotatably in one direction or the other it will rotate the shaft and its attached arm 82, rotation of the arm 82 moving the pinion 83 over the interior ring gear 70 causing said pinion 83 to rotate. Rotation of pinion 83 will cause rotation of the cam gear 84 meshing with said pinion and thus cam 60 will likewise be rotated so that either one or the other of the actuating arms 47 or 51 of the respective switches 45 or 46 will be moved to complete the grounding circuit for the electric motor and render said electric motor active. If the lever 71 attached to the collar 69 is oscillated, rotation of the tubular member 68 in one direction or the other results thereby causing the ring gear 70 attached to said tubular member 68 to be likewise rotated. Rotation of ring gear 70 by lever 71 will cause rotation of the pinion 83 and consequent rotation of the cam gear 84 so that through the movement of the lever 71 the cam 60 is also moved.

Lever 81 is connected through any suitable links 90 and 91 with a manually operable lever 92 movable into any one of a plurality of selected positions 93. Ordinarily lever 92 has means for releasably holding it in any one of the selected positions into which it is moved. Lever 71 as shown in Fig. 1 has one end of link 94 secured thereto, the other end of the link being attached to a clevis 95 secured adjacent the outer end of the actuator shaft 26.

Figure 5:
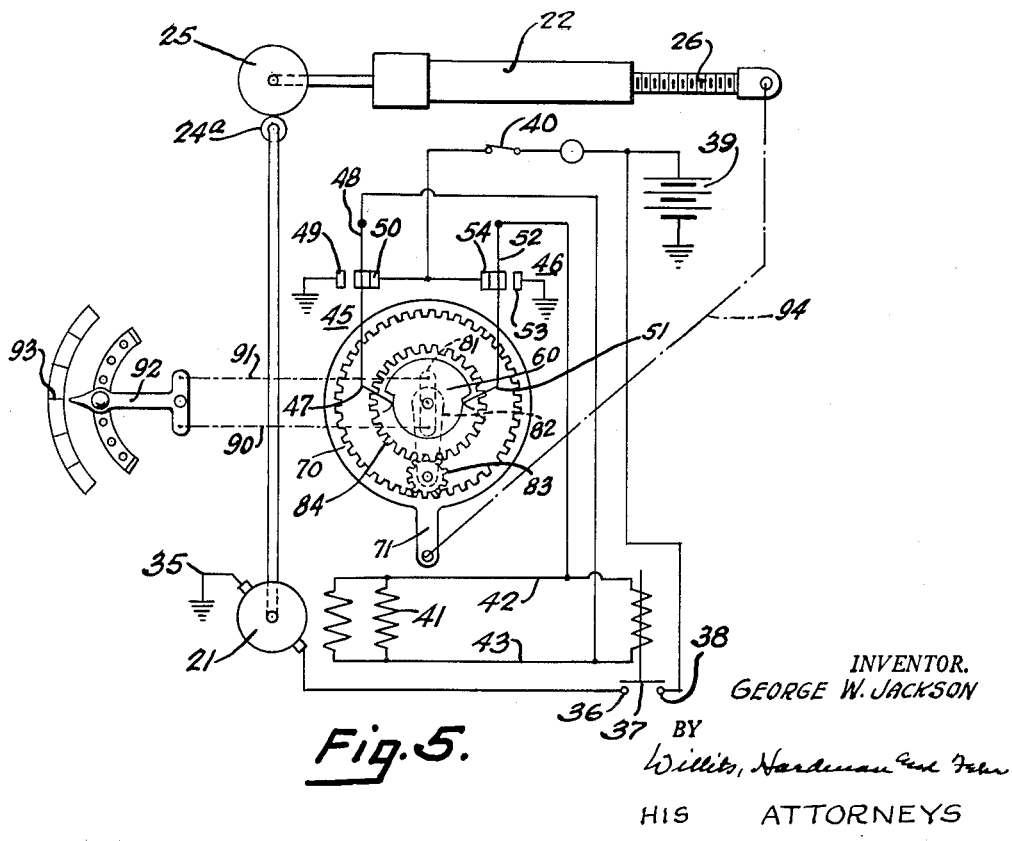
Fig. 5 is a diagrammatic view of the various elements and their mechanical and electrical connections in one position.

Fig. 5 schematically illustrates the mechanism in a normal intermediate position, the lever 92 being in a position midway between its two extremes, one extreme being the full actuator retracting position the other the full actuator extending position. The link connection 94 in Fig. 5 is illustrated by dot-dash lines. The terminals 50 and 54 of the switches 45 and 46 respectively are both electrically connectible with the storage battery 39 by the closing of the master switch 40. If it is desired to extend the actuator from the normal intermediate position as shown in Fig. 5, the operator moves the lever 92 into the desired actuator extension position as for instance into the position as shown in Fig. 6. The connection between lever 92 and the arm 82 will cause said arm 82 to be adjusted in a corresponding position as shown in Fig. 6, adjustment of the arm in this new position moving the pinion 83 over the teeth of the stationary, internal ring gear 73, resulting in the rotation of pinion 83 which will cause the cam gear 84 and its attached cam 60 to be rotated so that the cam 60 will be moved from its normal position as shown in Figs. 4 and 5 into the newly selected position as shown in Fig. 6 in which the raised surface of the cam moves the operating arm 47 of the switch 45 so that contact blade 48 of said switch is disengaged from the live, battery connected terminal 50 and moved into electrical engagement with the contact terminal 49 thereby completing the ground connection for the electric motor. Now current will flow from the battery 39 through the master switch 40 across the engaging contacts 54 and 52 of the switch 46 to lead wire 42, field windings 41 of the motor through the lead wire 43 across engaging contacts 48 and 49 of the switch 45 back to the battery via the ground connections. A circuit will also be established through the winding of the electromagnetic switch 37 energizing said switch to bridge contacts 36 and 38 which closes the armature circuit of the electric motor 21. Now the electric motor 21 is energized and activated to run in a direction so that the tubular member 22 of the actuator is rotated to move the engaging nut 27 (Fig. 1) and its attached shaft 26 outwardly of the housing or on its extension cycle. As the shaft 26 moves outwardly the link connection 94 therewith will rotate the lever 71 in a counterclockwise direction as regards Figs. 5 and 6 thereby rotating the ring gear 70 in this same direction and consequently causing rotation of the pinion in a direction opposite to that in which it was rotated by the manual operation of the arm 82 by lever 92. This rotation of the pinion 83 by the ring gear 70 causes the cam gear 84 and its cam again to be rotated, in this instance in a direction to rotate the cam 60 into its normal position as shown in Figs. 4 and 7. Fig. 7 shows the cam in full normal position by the movement of the actuator shaft 26 into the selected extended position corresponding to the position into which the manual lever 92 has previously been moved. With the cam 60 in its normal position as shown in Fig. 7 the grounded connection through contacts 48 and 49 of the switch 45 is again broken thereby rendering the electric motor 21 inactive. It will be noted that the planetary gear connections between the cam 60 and the levers 92 and 71 permit return of the cam 60 to its normal position without necessitating any consequent movement of the lever 92 and its connected arm 82 out of the selected position into which it has been moved. Thus, any selected adjustment of the actuator from one position to another, either extended or retracted, is made from the position of the manually operable lever 92 in which it previously has been moved.

It will, of course, be understood that if a retracting operation of the actuator into a desired position is necessary the manually operable lever 92 is moved clockwise as regards Figs. 5, 6 and 7, resulting in a reverse movement of the mechanism and thus bring into effect the control switch 46 to complete motor grounding circuits whereby the electric motor is caused to rotate in a direction for retracting the shaft 26 of the actuator. The indicator associated with the manually operated lever 92 visually indicates to the operator in what position the actuator, hidden from the view of the operator, has been previously adjusted.

A device of this kind may be used in adjusting the height of the cutters on reapers, mowers and the like, and may be also used for adjusting speed control mechanism for any suitable power driven machine or may also be used in operating closure members for any type of vehicle or where accurate adjustments of comparatively heavy loads by remote mechanisms may be made by the operator.

While the embodiment of the present invention as herein disclosed, constitutes a preferred form, it is to be understood that other forms might be adopted.

What is claimed is as follows:

1. In combination with an actuator driven by a reversible electric motor for transmitting power in either direction, of a control mechanism manually operative to render the electric motor active in either direction and operative by the actuator to stop the electric motor, said control mechanism consisting of two electric switches in circuit with the motor, each switch having two stationary terminals and a movable contact, one stationary terminal of each switch being connected to one pole of a power source and normally not engaged by the movable contact of the respective switch, the second stationary terminal of each switch, normally engaged by the movable contact of said switch, being connected to the other pole of the power source, the movable contact of each switch being connected to the electric motor; a switch operating cam interposed between and engaged by the movable contacts of both switches, an arm rotatably supported coaxially of the cam, a manually operable lever connected to said arm for swinging it about its support in either direction of rotation; a gear train including a gear on the cam concentric therewith, a pinion rotatably mounted on the free end of said arm, and an internal ring gear mounted coaxially of the cam gear and meshing with the pinion; said cam being rotatable in one direction or the other for moving the movable contact of one or the other switch into engagement with its cooperating said one stationary terminal whereby the motor is energized to rotate in one or the other direction to the lever into any one of its plurality of selected positions swings the arm into predetermined corresponding positions, the swinging of the arm moving the pinion within the ring gear and thereby rolling it over the ring gear, the rotating pinion turning the cam gear and cam thereby causing said cam to actuate a switch into motor circuit closing position and causing the motor to operate in one direction; and a link attached to the actuator and operatively connected to the ring gear said link rotating the ring gear in response to and in accordance with the movement of the actuator, whereby the pinion is rotated and said pinion in turn rotates the cam gear and cam to normal position in which the both switches are in motor circuit opening positions and the motor rendered inactive.

2. In combination with an actuator extendable or retractable by a reversible electric motor, of a control mechanism manually operative for rendering the electric motor active in either direction and operative by the actuator for rendering the motor inactive, said control mechanism consisting of two switches connected with the motor, each switch normally maintaining the motor circuit open; a cam engaged by said switches and normally maintaining both switches in normal, motor circuit open position, said cam being rotatable in either direction to move one or the other switch into motor circuit closing position for rendering the electric motor active in one or the other direction respectively; an arm rotatably supported coaxially of the cam; a manually operable lever connected to said arm for swinging it about its support in either direction; a link attached to the actuator and moved thereby as said actuator is extended or retracted; and a planetary gear train including a gear on the cam concentric thereof; a pinion rotatably secured to the free end of the arm, said pinion meshing with said cam gear, and an internal ring gear mounted coaxially of the cam gear and meshing with the pinion, the said link being attached to said ring gear for rotating it in response to and in accordance with actuator movement.

3. In combination with an actuator extendable or retractable by a reversible electric motor, of a control mechanism manually operative for rendering the electric motor active in either direction and operative by the actuator for rendering the motor inactive, said control mechanism consisting of two switches connected with the motor, each switch normally maintaining the motor circuit open; a cam engaged by said switches and normally maintaining both switches in normal, motor circuit open position, said cam being rotatable in either direction to move one or the other switch into motor circuit closing position for rendering the electric motor active in one or the other direction respectively, said cam having a gear provided thereon; an arm pivoted at one end coaxially of the cam gear, said arm having a pinion rotatably secured to its other end, said pinion meshing with the cam gear; an internal ring gear rotatably supported coaxially of the cam gear and meshing with the pinion; a manually operable lever movable into a plurality of selected positions, said lever being operatively connected to said arm whereby movement of the lever into any one of its plurality of selected positions swings the arm into predetermined corresponding positions, the swinging of the arm moving the pinion within the ring gear and thereby rolling it over the ring gear, the rotating pinion turning the cam gear and cam thereby causing said cam to actuate a switch into motor circuit closing position and causing the motor to operate in one direction; and a link attached to the actuator and operatively connected to the ring gear said link rotating the ring gear in response to and in accordance with the movement of the actuator, whereby the pinion is rotated and said pinion in turn rotates the cam gear and cam to normal position in which both switches are in motor circuit opening positions and the motor rendered inactive.

4. An actuator consisting of a housing in which a shaft is reciprocatively supported, said housing containing a reversible electric motor operatively connected to the shaft for extending it from or retracting it into said housing in accordance with the direction of rotation of the motor, a control mechanism in said housing, operative to control the duration of motor operation in either direction, said control mechanism consisting of two electric switches connected to the motor and selectively operative into circuit closing positions for effecting motor operation in one direction or the other respectively, a tubular member rotatably supported in said housing, one end of said member having a lever connected thereto, the other end having an internal ring gear attached thereto; a shaft rotatably supported in said tubular member, the one end of said shaft having a lever secured thereto, the other end of said shaft having an arm attached thereto so as to be rotatable with said shaft; a pinion rotatably mounted on the free end of said arm and meshing with the internal ring gear; a cam carried by said shaft so as to be rotatable relatively thereto said cam having a gear thereon, coaxial of the shaft and meshing with said pinion, said cam being engaged by a member of each switch and normally maintaining said members of the respective switches in circuit opening positions, the cam having provisions for actuating one or the other of said switch members into circuit closing position dependent upon the direction of rotative adjustment of said cam out of normal position, a control lever operable manually into any one of a plurality of selected positions, said control lever being connected to the lever on the shaft, and a link attached to the reciprocative shaft of the actuator and connected to the lever attached to the tubular member carrying the ring gear.

References Cited in the file of this patent
UNITED STATES PATENTS

| | | |
|---|---|---|
| 1,670,824 | Roth | May 22, 1928 |
| 2,025,122 | Paitras et al. | Dec. 24, 1935 |
| 2,471,220 | Lear | May 24, 1949 |
| 2,609,165 | Hill | Sept. 2, 1952 |